US008966911B2

(12) United States Patent
Ress, Jr. et al.

(10) Patent No.: US 8,966,911 B2
(45) Date of Patent: Mar. 3, 2015

(54) TURBOFAN ENGINE WITH HP AND LP POWER OFF-TAKES

(75) Inventors: Robert A. Ress, Jr., Carmel, IN (US); Todd Anthony Godleski, Fishers, IN (US)

(73) Assignee: Rolls-Royce North American Technologies, Inc., Indianapolis, IN (US)

(*) Notice: Subject to any disclaimer, the term of this patent is extended or adjusted under 35 U.S.C. 154(b) by 1105 days.

(21) Appl. No.: 12/960,779

(22) Filed: Dec. 6, 2010

(65) Prior Publication Data

US 2011/0154827 A1  Jun. 30, 2011

Related U.S. Application Data

(60) Provisional application No. 61/290,726, filed on Dec. 29, 2009.

(51) Int. Cl.
*F02C 7/32* (2006.01)
*F02C 7/275* (2006.01)
(Continued)

(52) U.S. Cl.
CPC . *F02C 7/32* (2013.01); *F02C 7/275* (2013.01); *F02C 7/36* (2013.01); *F02K 3/06* (2013.01); *F05D 2220/76* (2013.01); *F05D 2260/4031* (2013.01); *Y10S 74/05* (2013.01)
USPC ............... 60/802; 60/796; 60/788; 74/DIG. 5

(58) Field of Classification Search
CPC ............ F01D 15/10; F02C 7/275; F02C 7/32; F02C 7/36; F05D 2220/76; F05D 2260/4031
USPC ......... 60/268, 786–788, 792, 39.162, 39.163, 60/801, 802
See application file for complete search history.

(56) References Cited

U.S. PATENT DOCUMENTS 2,803,943 A   8/1957   Rainbow
3,543,588 A   12/1970  Richardson
(Continued)

FOREIGN PATENT DOCUMENTS

EP   0798454 A2   10/1997
EP   1911938 A1   4/2008
(Continued)

OTHER PUBLICATIONS

International Search Report and Written Opinion, May 19, 2011, PCT/US2010/062372.
(Continued)

*Primary Examiner* — Phutthiwat Wongwian
*Assistant Examiner* — Marc J Amar
(74) *Attorney, Agent, or Firm* — Krieg DeVault LLP

(57) ABSTRACT

A turbofan gas turbine engine is provided having a unique power off-take shaft and gear system. Other gas turbine engine types are also contemplated herein. Two power off-takes are provided, one each for the low pressure spool and high pressure spool. The power off-takes extend across a core flow path of the turbofan engine between the low and high pressure shafts to a fan frame of the turbofan. A drive gear is provided near the front end of the high pressure shaft, and another drive gear is provided on the low pressure shaft near the drive gear for the high pressure shaft. Both gears are located in a sump of the gas turbine engine. The power off-take shafts are coupled to the drive gears. Two power devices are coupled to the power off-take shafts and are located in the fan frame. The power devices can be electric generators or motors.

15 Claims, 5 Drawing Sheets

(51) Int. Cl.
*F02C 7/36* (2006.01)
*F02K 3/06* (2006.01)

(56) References Cited

U.S. PATENT DOCUMENTS

| | | | |
|---|---|---|---|
| 3,688,560 A | 9/1972 | Broman et al. | |
| 4,044,973 A | 8/1977 | Moorehead | |
| 4,118,997 A | 10/1978 | Woodward et al. | |
| 4,497,171 A | 2/1985 | Corrigan et al. | |
| 4,912,921 A | 4/1990 | Rice et al. | |
| 5,349,814 A | 9/1994 | Ciokajilo et al. | |
| 5,435,124 A | 7/1995 | Sadil et al. | |
| 5,694,765 A | 12/1997 | Hield et al. | |
| 5,867,979 A | 2/1999 | Newton et al. | |
| 5,867,980 A | 2/1999 | Bartos | |
| 6,170,252 B1 | 1/2001 | Van Duyn | |
| 6,260,351 B1 | 7/2001 | Delano et al. | |
| 6,357,220 B1 | 3/2002 | Snyder et al. | |
| 6,447,248 B1 | 9/2002 | Kastl et al. | |
| 6,467,725 B1 | 10/2002 | Coles et al. | |
| 6,851,267 B2 | 2/2005 | Bruno et al. | |
| 6,914,344 B2 | 7/2005 | Franchet et al. | |
| 7,013,651 B2 | 3/2006 | Bruno et al. | |
| 7,055,330 B2 | 6/2006 | Miller | |
| 7,059,136 B2 | 6/2006 | Coffinberry | |
| 8,042,341 B2 | 10/2011 | Charier et al. | |
| 2005/0132693 A1* | 6/2005 | Macfarlane et al. | 60/39.08 |
| 2006/0010875 A1 | 1/2006 | Mahoney et al. | |
| 2006/0101804 A1 | 5/2006 | Stretton | |
| 2006/0225431 A1 | 10/2006 | Kupratis | |
| 2006/0248900 A1* | 11/2006 | Suciu et al. | 60/802 |
| 2006/0260323 A1 | 11/2006 | Moulebhar | |
| 2006/0272313 A1 | 12/2006 | Eick et al. | |
| 2007/0022735 A1 | 2/2007 | Henry et al. | |
| 2007/0084216 A1 | 4/2007 | Mazeaud et al. | |
| 2007/0137219 A1 | 6/2007 | Linet et al. | |
| 2007/0151258 A1* | 7/2007 | Gaines et al. | 60/792 |
| 2007/0289310 A1 | 12/2007 | Dooley et al. | |
| 2008/0148881 A1* | 6/2008 | Moniz et al. | 74/15.6 |
| 2009/0007569 A1 | 1/2009 | Lemmers, Jr. et al. | |
| 2009/0290976 A1* | 11/2009 | Suciu et al. | 415/122.1 |

FOREIGN PATENT DOCUMENTS

| | | |
|---|---|---|
| EP | 2 085 589 A2 | 8/2009 |
| GB | 1127659 A | 9/1968 |
| WO | WO 95/02120 A1 | 1/1995 |

OTHER PUBLICATIONS

Extended European Search Report, EP 10844286.4, Rolls-Royce North American Technologies, Inc., Dec. 18, 2014.

* cited by examiner

TURBOFAN ENGINE WITH HP AND LP POWER OFF-TAKES

CROSS REFERENCE TO RELATED APPLICATIONS

The present application claims the benefit of U.S. Provisional Patent Application 61/290,726, filed Dec. 29, 2009, and is incorporated herein by reference.

FIELD OF THE INVENTION

The present invention generally relates to gas turbine engine power systems, and more particularly, but not exclusively, to power off-takes.

BACKGROUND

Transferring power to and from spool shafts of a gas turbine engine remains an area of interest. Unfortunately, some existing systems have various shortcomings relative to certain applications. Accordingly, there remains a need for further contributions in this area of technology.

SUMMARY

One embodiment of the present invention is a gas turbine engine having a unique gearing system for a power off-take device. Other embodiments include apparatuses, systems, devices, hardware, methods, and combinations for power off-take arrangements. Further embodiments, forms, features, aspects, benefits, and advantages of the present application shall become apparent from the description and figures provided herewith.

DETAILED DESCRIPTION OF THE ILLUSTRATIVE EMBODIMENTS

Figure 1:
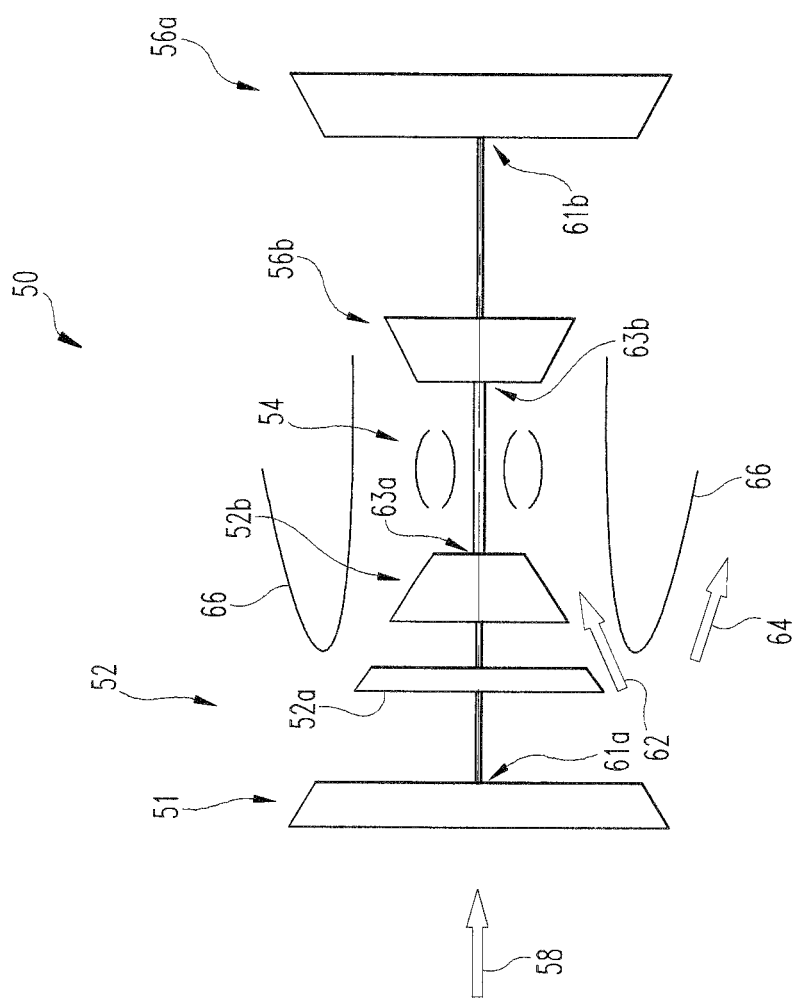
FIG. 1 is a view of a gas turbine engine capable of receiving one embodiment of the present application.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

With reference to FIG. 1, a gas turbine engine 50 is shown having a fan 51, compressor 52, combustor 54, and turbine 56, which together may be used as an aircraft power plant. The illustrative embodiment is depicted relative to a turbofan engine, but certain aspects of the present application can also be applied in other types of gas turbine engines, such as turbojets, turboshafts, or turboprops, to set forth just three nonlimiting examples. Airflow 58 enters the gas turbine engine and is compressed by compressor 52 before entering combustor 54 where it is mixed with fuel and burned before being expanded by turbine 56. Rotating shafting 60 connects the turbine 56 to the compressor 52 and serves to transfer power between the two. Rotating shafting 60 includes a relatively low pressure shaft 60a and a relatively high pressure shaft 60b, which will be described further below. In other embodiments, shafting 60 can include other number of shafts. To set forth just one non-limiting example, additional shafting may be included in some embodiments such that shafting 60 includes three or more shafts. For ease of convenience the relatively low pressure shaft 60a will be referred to below as low pressure shaft 60a, though no limitation is intended as to whether the relatively low pressure shaft 60a is the lowest pressure shaft of any given embodiment of the gas turbine engine 50. Additionally for ease of convenience the relatively high pressure shaft 60b will be referred to below as high pressure shaft 60b, though no limitation is intended as to whether the relatively high pressure shaft 60b is the highest pressure shaft of any given embodiment of the gas turbine engine 50. Furthermore, the terms "low" and "high" used throughout the application are used to designate relatively low pressure components and/or sections and relatively high pressure components and/or sections. The terms are not limited to denote the lowest or the highest pressure components and/or sections, though such designation can be used in some embodiments. Though the illustrative embodiment depicts an axial flow gas turbine engine, centrifugal compressors and/or turbines can also be incorporated in some alternative embodiments.

As used herein, the term "aircraft" includes, but is not limited to, airplanes, unmanned space vehicles, fixed wing vehicles, variable wing vehicles, rotary wing vehicles, hover crafts, and others. Further, the present inventions are contemplated for utilization in other applications that may not be coupled with an aircraft such as, for example, industrial applications, power generation, pumping sets, naval propulsion and other applications known to one of ordinary skill in the art.

The compressor 52 includes a low pressure compressor 52a and a high pressure compressor 52b, each of which are connected to corresponding shafts denoted as low pressure shaft 60a and high pressure shaft 60b, either of which are sometimes referred to as spool shafts. In particular, low pressure compressor 52a is connected to low pressure shaft 60a, and high pressure compressor 52b is connected to high pressure shaft 60b.

The turbine 56 includes a low pressure turbine 56a and a high pressure turbine 56b, each of which are connected to corresponding shafts denoted as low pressure shaft 60a and high pressure shaft 60b. Low pressure turbine 56a and high pressure turbine 56b rotate at the same rate as corresponding low pressure compressor 52a and high pressure compressor 52b, respectively. In other embodiments, however, mechanisms can be incorporated into the gas turbine engine 50 to provide for variable rates of rotation between a turbine and a corresponding compressor. For example, gearing can be added to provide for variable rates of rotation between a turbine and any other device to which it is connected.

Low pressure shaft 60a and high pressure shaft 60b are elongate shafts capable of being rotated at high speeds. Shafts 60a and 60b can be constructed as a unitary whole or may have many separate parts joined together to form the whole. In some embodiments, one or more of the shafts may be solid.

Low pressure shaft 60a is coaxially received within an inner space of the high pressure shaft 60b. As will be appreciated, the high pressure shaft 60b connects the high pressure spool components located closest to the combustor, and as a result is shorter in length than the low pressure shaft 60a which connects low pressure spool components located further from the combustor. The low pressure shaft 60a thus extends further forward and further aft than the high pressure shaft 60b. As used herein, the term "forward" refers to either the area or region of the gas turbine engine located on the compressor and fan side of the combustor, or the term refers to a direction or path that follows generally from the turbine to the compressor side of the gas turbine engine. Likewise, the term "aft" refers to either the area or region on the turbine side of the combustor or a direction or path from the compressor or fan side to the turbine side. As will be appreciated, therefore, a portion of the low pressure shaft 60a resides within the high pressure shaft 60b, while a portion of the low pressure shaft 60b is exposed.

Low pressure shaft 60a includes a forward end 61a and an aft end 61b. Likewise, high pressure shaft 60b includes a forward end 63a and an aft end 63b. The portion of the low pressure shaft 60a that extends further forward than the forward end 63a of the high pressure shaft is thus exposed. As used herein, the term "exposed" is a relative term and refers to the portion of the low pressure shaft 60a that does not rotate within the inner cavity of the high pressure shaft 60b, whether or not that portion of the low pressure shaft 60a is open to the environment or other spaces.

The gas turbine engine of the illustrative embodiment includes two separate engine spools, which term is sometimes used to indicate the combination of a compressor section, a shaft, and a turbine section. In some applications, however, a spool may not include a corresponding compressor, as would be the case with some turboshaft engines. In some non-limiting embodiments the spools can be referred to as a high pressure (HP) spool and a low pressure (LP) spool and are usually free to rotate at different speeds. The HP spool includes a high pressure compressor, high pressure shaft, and high pressure turbine which are sometimes denoted as HP compressor, HP shaft, and HP turbine, respectively. Likewise, the LP spool includes a fan, a low pressure compressor, low pressure shaft, and low pressure turbine which are sometimes denoted as LP compressor, LP shaft, and LP turbine, respectively. Some embodiments, however, can have a low pressure spool without a corresponding compressor, such as would be the case with a turbofan engine having no low pressure compressor section. Furthermore, some embodiments can have a low pressure spool without a fan. In still other embodiments, the gas turbine engine can include additional spools than those depicted in the illustrative embodiment, such as an intermediate spool to set forth just one nonlimiting example.

The fan frame 66 is disposed within the gas turbine engine 50 and is used to bifurcate the flow into a core flow path 62 and a bypass flow path 64, such as occurs with turbofan engines as depicted in the illustrative embodiment. In some embodiments, the fan frame 66 can be arranged to provide more than two flow paths. For example, the fan frame 66 can be constructed to trifurcate the flow, to set forth just one nonlimiting example. Additionally and/or alternatively, other structure can also be used to separate the flow, whether or not the structure is referred to as a fan frame.

Figure 2:
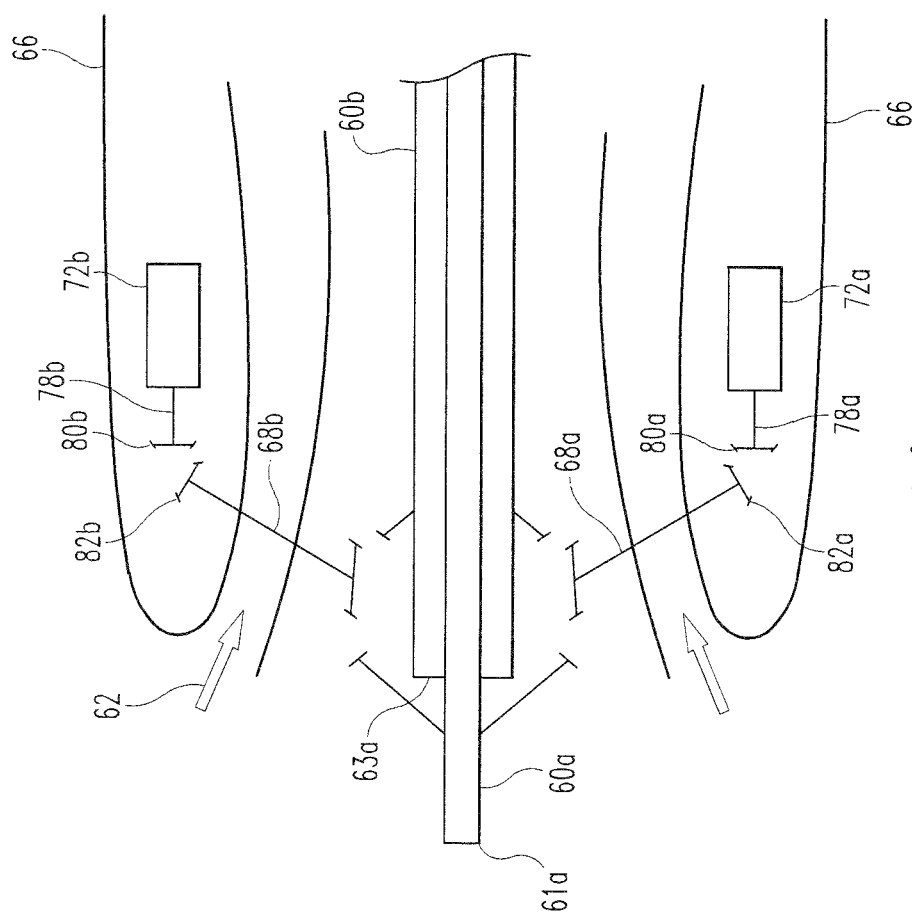
FIG. 2 is a view of a gas turbine engine having one embodiment of the present application.
Figure 3:
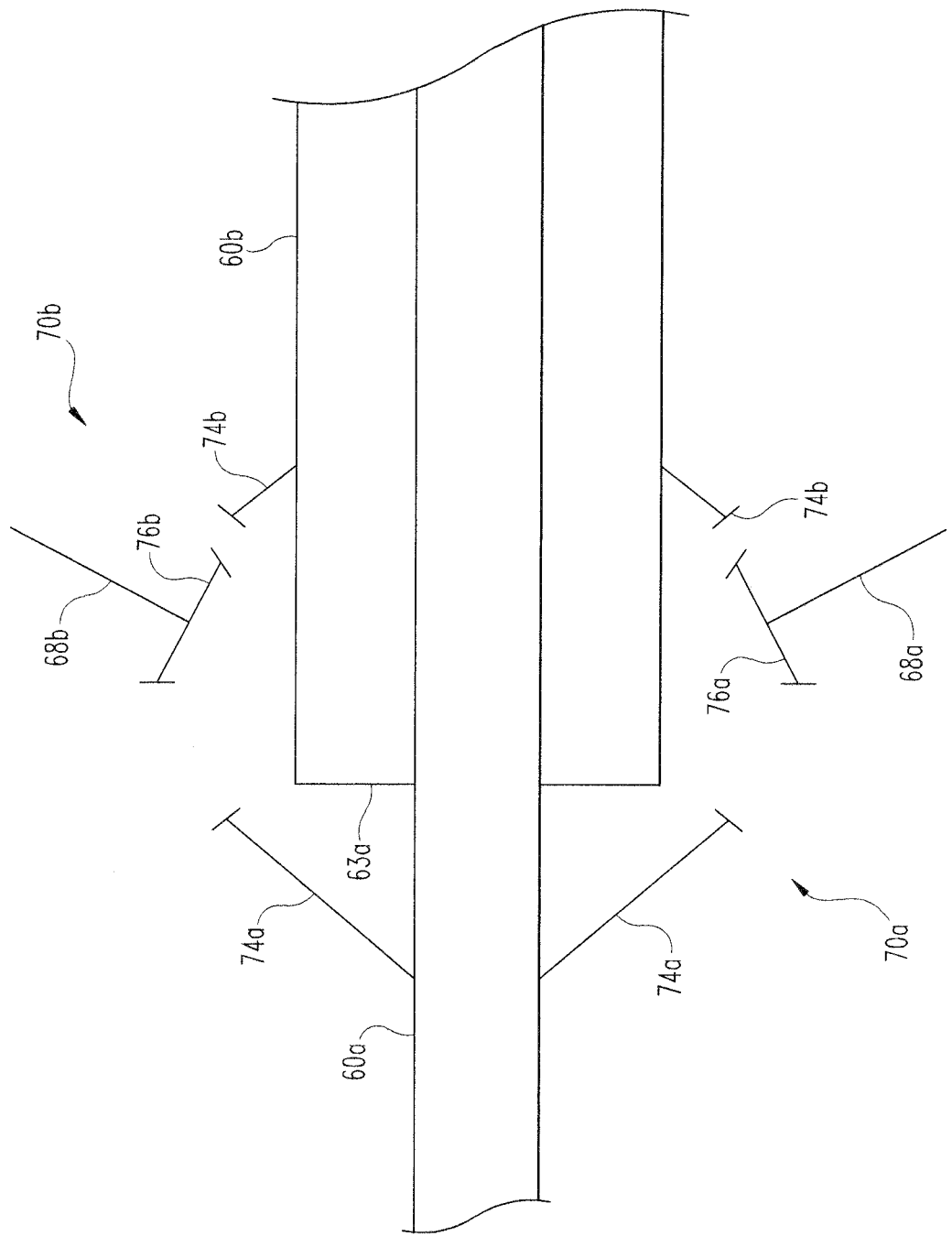
FIG. 3 is a view of a gas turbine engine having one embodiment of the present application.

Referring now to FIGS. 2 and 3, a partial cross sectional view is shown of the gas turbine engine 50 depicted in FIG. 1 having one embodiment of the present invention. Power off-take shafts 68a and 68b are shown extending across core flow path 62 and are used to provide power to or extract power from the LP shaft 60a and HP shaft 60b. In some embodiments the power off-take shafts are referred to as towershafts. Though only two power off-take shafts are depicted, some embodiments may include any number of power off-takes. The power off-take shafts 68a and 68b are coupled with the LP shaft 60a and HP shaft 60b through gearing 70a and 70b, respectively. Power devices 72a and 72b are coupled with the corresponding power off-take gears 82a and 82b of power off-take shafts 68a and 68b, respectively and are located in the fan frame 66. Though only two power devices are depicted, some embodiments may include any number of power devices. One or more gearboxes can be used to couple the power off-take shafts 68a and 68b to the LP and HP shafts 60a and 60b as well as power devices 72a and 72b.

Power off-take shaft 68a is an elongate shaft that rotates with LP shaft 60a and provides for the transfer of mechanical power. The power off-take shaft 68a is configured to withstand a variety of stresses, such as axial and torsional stresses, and is depicted as a solid shaft in the illustrative embodiment. Other embodiments, however, may utilize a hollow or partially hollow shaft. The power off-take shaft 68a is arranged at an angle with respect to low pressure shaft 60a, but can be aligned along the axis of shaft 60a in some embodiments. Co-axial alignment with shaft 60a may be accomplished by gearing or other mechanical devices. Furthermore, power off-take shaft 68a can be composed of a number of separately manufactured shafts that have been joined, mechanically or otherwise, to form a common shaft, or can be composed of a number of shafts that are joined through gearing to form a network of interconnected shafts to provide for the transfer of mechanical power to and/or from the low pressure shaft 60a.

As with power off-take shaft 68a, power off-take shaft 68b can be an elongate shaft that rotates with HP shaft 60b and provides for the transfer of mechanical power. However, power off-take shaft 68b need not have the same proportions or geometry as power off-take shaft 68a. The power off-take shaft 68b is configured to withstand a variety of stresses, such as axial and torsional stresses, and is depicted as a solid shaft in the illustrative embodiment. Other embodiments, however, can utilize a hollow, or partially hollow, shaft 68b. The power off-take shaft 68b is arranged at an angle with respect to high pressure shaft 60b in the illustrative embodiment, but can be aligned along the axis of shaft 60b in some embodiments. Co-axial alignment with shaft 60a can be accomplished by gearing or other mechanical devices. Furthermore, power off-take shaft 68b can be composed of a number of separately manufactured shafts that have been joined, mechanically or otherwise, to form a common shaft, or can be composed of a number of shafts that are joined through gearing to form a network of interconnected shafts to provide for the transfer of mechanical power to and/or from the low pressure shaft 60a.

Both power off-take shafts 68a and 68b extend between the fan frame 66 and the LP and HP shafts 60a and 60b. In some embodiments, the power off-take shafts 68a and 68b can extend beyond the fan frame and in some cases or to an area external to an engine case of the gas turbine engine 50, as will be described further hereinbelow.

Within the gas turbine engine the power off-take shafts 68a and 68b are displaced axially and circumferentially relative to each other. In some embodiments, however, it can be possible to orient the power off-take shafts 68a and 68b in the same axial plane but at different circumferential locations, or orient the shafts 68a and 68b at the same circumferential location but in different axial planes. Such orientations can be produced though simple change in placement of the shafts 68a and 68b and/or through the use of mechanical devices such as gearing, to set forth just one nonlimiting example.

Gearing 70a and 70b is provided to couple the power off-take shafts 68a and 68b with the LP shaft 60a and HP shaft 60b, respectively. Gearing 70a and 70b can be housed within an enclosure, can be referred to as a gearbox, and can include more gearing and/or additional shafts than those depicted in the illustrative embodiment. In one non-limiting example, multiple lay shafts can be used to set the speed of any particular power device coupled to the shafting. Other gears and/or gear boxes can be used to change the relative orientation of shafts, or to change the gear ratio much like a speed reduction gear, to set forth just two nonlimiting examples. Gearing 70a and 70b are shown as bevel gears in the illustrative embodiment, but may be other gear types in other embodiments. For example, the bevel gearing could be replaced by a spur gear or crown gear, to set forth just two non-limiting examples. In some applications, a clutch can be used to selectively couple the power off-take shafts 68a and 68b to the LP shaft 60a and HP shaft 60b, respectively. For example, a wet clutch can be used in such applications.

In some embodiments the gearing 70a and 70b can be located in a sump of the gas turbine engine near the forward end of the HP shaft 60b. In these embodiments, gearing 70b can be at the forward end of the HP shaft 60b, while gearing 70a can be at the aft end of the exposed part of LP shaft 60a. In this way the gearing 70a and 70b are in close proximity to each other. In some embodiments, however, the gearing 70a and 70b need not be in a common sump area. In addition, gearing 70a and 70b need not be located in proximity to each other.

Gearing 70a includes a low pressure drive gear 74a and a low pressure driven gear 76a. As used herein, the terms "drive" or "driven" when used in association with any type of gear is not meant to imply that the gear is always used to provide a "drive" force or torque, or is always "driven" by another gear. It will be appreciated that power off-take shafts 68a and 68b can be used to extract power from either LP shaft 60a or HP shaft 60b, or it can be used to supply power to the shafts 60a and 60b. As such, the terms "drive" and "driven" do not have strict meaning associated with their function, but rather are used to distinguish one gear from another for ease of description and understanding. Low pressure drive gear 74a is coupled and rotates with the LP shaft 60a. Low pressure driven gear 76a, however, is coupled and rotates with power off-take shaft 68a. The gear teeth of low pressure drive gear 74a interact with the teeth of low pressure driven gear 76a such that rotation in either low pressure shaft 60a or power off-take 68a causes rotation in the other.

Gearing 70b includes a high pressure drive gear 74b and a high pressure driven gear 76b. High pressure drive gear 74b is coupled and rotates with the HP shaft 60b. High pressure driven gear 76b, however, is coupled and rotates with power off-take shaft 68b. The gear teeth of high pressure drive gear 74b interact with the teeth of high pressure driven gear 76b such that rotation in either high pressure shaft 60b or power off-take shaft 68b causes rotation in the other.

Power devices 72a and 72b are positioned within the fan frame 66 and can be any type of electrical device that converts electrical power to/from mechanical rotational power of the power off-take shafts 68. For example, power device 72b could be an electric starter/generator useful to facilitate engine starting, to set forth just one nonlimiting example. The power device 72b might also be an engine oil pump and fuel pump metering unit (FPMU). In another example, power device 72a might be customer hydraulic pumps and a permanent magnet alternator (PMA)/generator. In yet another example, if either or both power devices 72a and 72b are generators then power sharing can occur between the LP and HP shafts 60a and 60b. Though the power devices 72a and 72b are shown within the fan frame 66, other embodiments can locate the power devices elsewhere, including the OD of the fan frame, or external to the engine case, to set forth just two nonlimiting examples.

Power devices 72a and 72b include power device shafts 78a and 78b as well as power device gears 80a and 80b. In some embodiments, however, the power devices 72a and 72b may not include either power device shafts 78a, 78b or power device gears 80a, 80b. Instead, the power devices 72a and 72b can be coupled to a gear box that includes the power device shafts 78a, 78b and power device gears 80a and 80b. Such a gearbox can have multiple lay shafts. In some embodiments a clutch can alternatively and/or additionally be used to selectively couple either or both the power devices 72a and 72b, and/or any intermediate gearing or gearboxes, to the power off-take shafts 68a and 68b. For example, a wet clutch or other type of clutch mechanism can be used.

The power device shafts 78a and 78b extend from the power devices 72a and 72b and remain within the fan frame 66. In some embodiments, however, the power device shafts 78a and 78b can extend beyond the fan frame 66. In such an example the power off-take shafts 68a and 68b can also extend to the OD of the fan frame. In one example in which only two shafts are provided in the gas turbine engine 50, one of the shafts 68a and 68b can terminate within the fan frame and another can extend beyond. In another non-limiting example, a power off-take shaft can extend to and terminate between flow paths as was discussed above. The shafts 78a and 78b are configured to withstand a variety of stresses, such as axial and torsional stresses.

The power device gears 80a and 80b are coupled and rotate with the power device shafts 78a and 78b. The power device gears 80a and 80b are shown as bevel gears in the illustrative embodiment, but may be other gear types in other embodiments. For example, the bevel gearing could be replaced by a spur gear or crown gear, to set forth just two non-limiting embodiments.

The power off-take gears 82a and 82b are coupled and rotate with the power off-take shafts 68a and 68b. Similar to the other gears described above, the power off-take gears 82a and 82b are shown as bevel gears in the illustrative embodiment, but may be other gear types in other embodiments. For example, the bevel gearing could be replaced by a spur gear or crown gear, to set forth just two non-limiting embodiments.

The power device gears 80a and 80b, as well as the power off-take gears 82a and 82b, can be housed within an enclosure, can be referred to as a gearbox, and can include more gearing and or additional shafts than those depicted in the illustrative embodiments. In one non-limiting example, multiple lay shafts can be used to set the speed of any particular power device coupled to the shafting. Other gears and/or gear boxes can be used to change the relative orientation of shafts, or to change the gear ratio much like a speed reduction gear, to set forth just two nonlimiting examples. The gear teeth of the power device gears 80a and 80b interact with the teeth of the power off-take gears 82a and 82b such that rotation in either power off-take shafts 68a, 68b or power device shafts 78a, 78b causes rotation in the other. Though the illustrative embodiment depicts the assembly of power device shafts 78a, 78b, the power off-take gears 82a, 82b, and the power device gears 80a, 80b, as being contained within the fan frame, other embodiments can include such structure on the OD of the fan frame 66. Additionally and/or alternatively, other shafting and/or gearing arrangements can be provided to transfer power between the power devices 72a, 72b and the power off-take shafts 78a, 78b.

Figure 4:
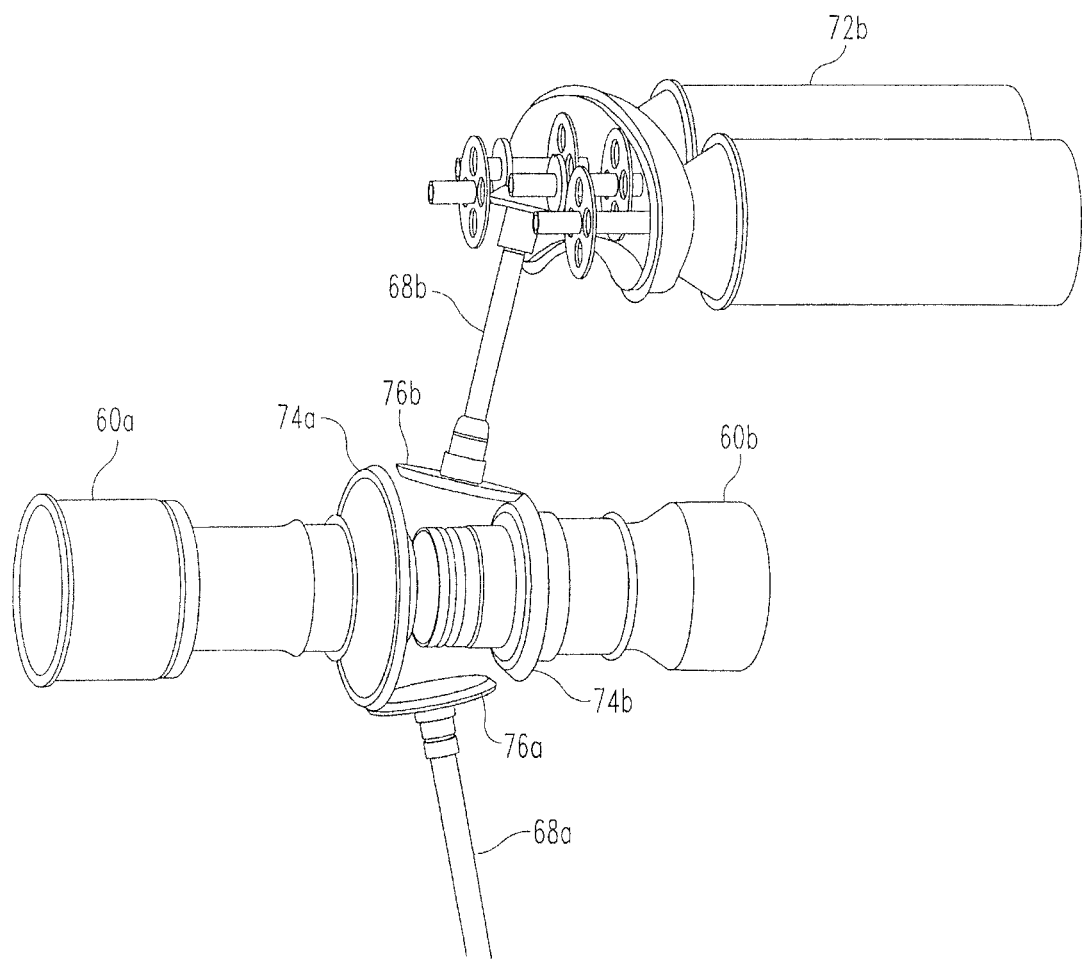
FIG. 4 is a view of certain aspects of the present application.

Referring now to FIG. 4, a view is shown of certain aspects of the present application depicted above in FIGS. 1-3. A small section of LP shaft and HP shaft 60a and 60b are shown in the figure, and are shown coupled to LP drive gear 74a and HP drive gear 74b. The LP driven gear 76a and HP driven gear 76b are coupled to the drive gears 74a and 74b. The power off-take shafts 68a and 68b are shown extending from the driven gears 76a and 76b. A power device 72b is shown coupled to power off-take gear 82b.

Figure 5:
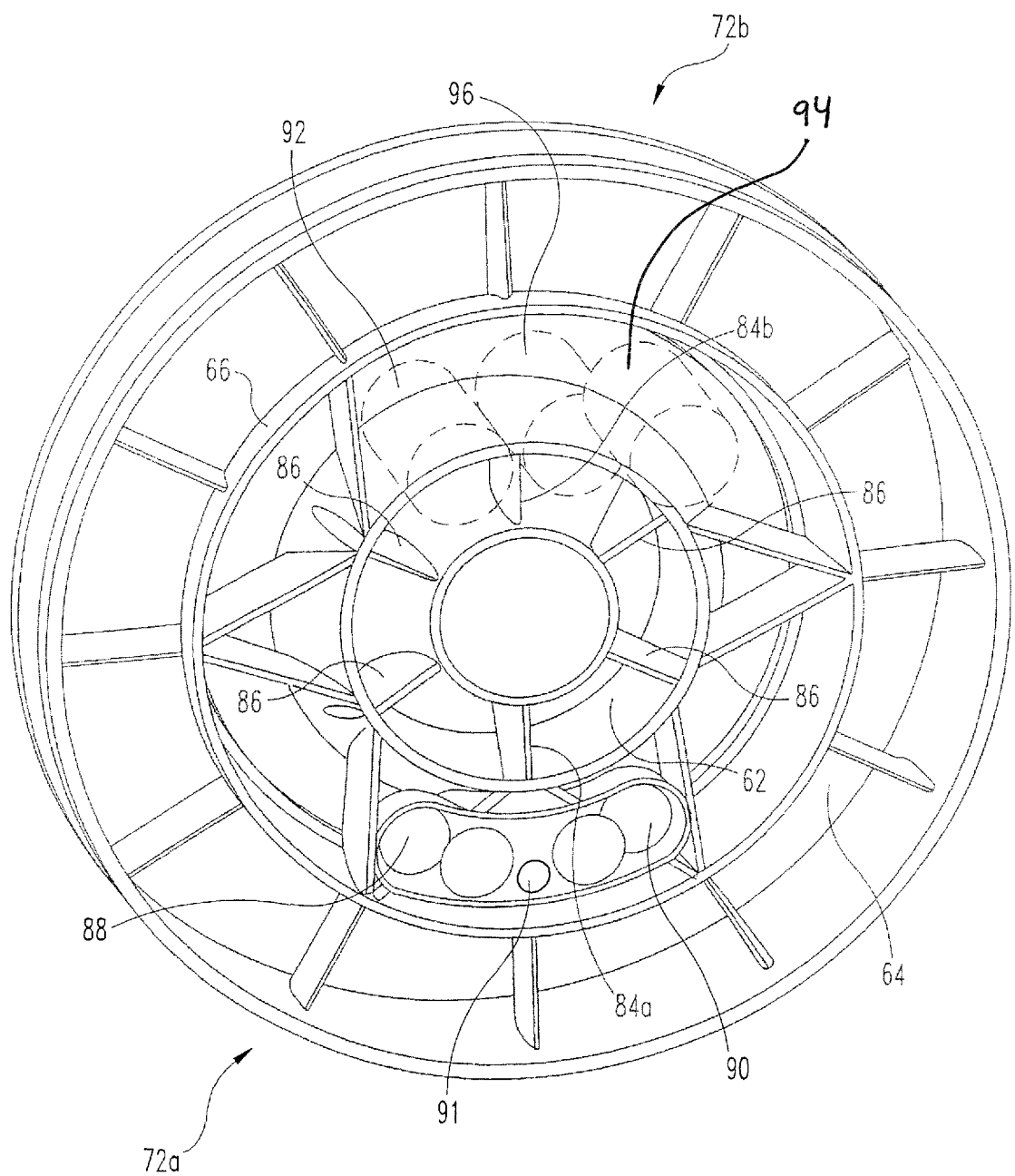
FIG. 5 is a view of certain aspects of the present application.

Turning now to FIG. 5, a view of a portion of one embodiment of the gas turbine engine 50 is shown. Also shown in the figure are the bypass flow path 64, core flow path 62, power devices 72a and 72b, as well as struts 84a, 84b, and 86. The bypass flow path 64 passes on the outside of the annular part of the figure, while the core flow path 62 passes on the inside. Power devices 72a and 72b are depicted as located in fan frame 66. Each of the power devices 72a and 72b are depicted as having multiple power devices in the illustrated embodiment, but it in other embodiments either or both the power devices 72a and 72b may have just a single power device. The power devices depicted in the figure are commonly engaged with one embodiment of a multi-pad accessory mount. As will be appreciated, a multi-pad accessory mount permits the mounting of several accessories to be driven off of a common drive. In the illustrated embodiment the accessories receive and/or transmit power with the power off-take shafts. Though the illustrated embodiment depicts a circumferential distribution of the accessories engaged with the multi-pad accessory mount, other embodiments can include a variety of other arrangements. Power device 72a includes a customer hydraulic pump 88 on the left side of the figure, and a customer hydraulic pump 90 on the right side. The power device 72a also includes a permanent magnet alternator 91. As used herein, the terms "right" and "left" are used for ease of convenience and are not intended to limit the location of any particular component relative to a gas turbine engine and/or its installation. The power device 72b includes an engine oil pump 92, a fuel pump metering unit 94, and an electric starter/generator 96. Any of the particular power devices used in either of power device 72a and 72b can be substituted with another power device. As such, the arrangement depicted in FIG. 5 is but one of many variations in the types of power devices that can be used in either or both of power devices 72a and 72b.

Struts 84a and 84b are enlarged versions of struts 86 and are used to house the power off-take shafts 68a and 68b. In some embodiments, however, struts 84a and 84b can be the same size as struts 86. The struts 84a, 84b, and 86 are circumferentially spaced at regular intervals, but can be spaced at non-regular intervals in some embodiments. The struts 84a and 84b extend across the core flow path 62, but can cross other flow paths in other embodiments. Struts 84a and 84b can be aerodynamic in shape to minimize total pressure loss and discourage separated flow downstream of the power off-take shafts 68a and 68b. The power off-take shafts 68a and 68b can be routed through any of the regularly circumferentially spaced struts 84a, 84b, and 86.

One aspect of the present application provides for a dual-spool gas turbine engine having two power off-take shafts that are separately coupled with low pressure and high pressure shafts of the gas turbine engine. The two power off-take shafts are coupled to the low and high pressure shafts via gearing and extend across a flow path of the gas turbine engine to a fan frame. Two separate power devices are located within the fan frame and are coupled to the ends of the two power off-take shafts via separate gear boxes. The power devices may either provide power to or generate power from the low or high pressure shafts. The present application permits, among other things, load sharing between the spools of the gas turbine engine.

Another aspect of the present application provides an apparatus comprising a gas turbine engine having at least two spool shafts and at least two rotatable shafts extending between a fan frame of the gas turbine engine and the spool shafts, wherein the at least two rotatable shafts are operatively coupled with the at least two spool shafts.

Yet another aspect of the present application provides an apparatus comprising a gas turbine engine having a first shaft of a first spool and a second shaft of a second spool, a first power off-take shaft oriented to extend across a flow path of the gas turbine engine and operatively coupled to the first shaft, and a second power off-take oriented to extend across the flow path of the gas turbine engine and operatively coupled to the second shaft, wherein the flow path is at least partially defined by a fan frame of the gas turbine engine.

Yet a further aspect of the present application provides an apparatus comprising a gas turbine engine having a first pressure spool shaft coaxially received within a second pressure spool shaft, wherein the first pressure spool shaft axially extends in a forward direction further than the second pressure spool shaft to provide a forward exposed area of the first pressure spool shaft, a first pressure spool gearing located at the forward end of the first pressure spool shaft, and a second pressure spool gearing located at the aft end of the forward exposed area of the first pressure spool shaft.

Yet still a further aspect of the present application provides a method comprising connecting at least two power off-take shafts to at least two spool shafts of a gas turbine engine, wherein the two power off-take shafts have ends disposed within a fan frame of the gas turbine engine.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. An apparatus comprising:
  a gas turbine engine having a first annular flow path disposed radially inward of a second annular flow path and at least two spool shafts;
  at least two rotatable shafts extending across the first annular flow path of the gas turbine engine and rotatingly coupled with at least one of the spool shafts;
  a first plurality of power devices in power communication with one of the at least two rotatable shafts and disposed between the first annular flow path and the second annular flow path;
  wherein the at least two spool shafts includes a first pressure spool shaft and second pressure spool shaft, and wherein one of the at least two rotatable shafts is driven by the first pressure spool shaft, and another of the at least two rotatable shafts is driven by the second pressure spool shaft;

wherein the at least two rotatable shafts are circumferentially offset from each other, and which further includes a second plurality of power devices apart from the first plurality of power devices that are in power communication with another of the at least two rotatable shafts; and wherein the first plurality of power devices and the second plurality of power devices are disposed within a fan frame of the gas turbine engine.

2. The apparatus of claim 1, which further includes struts to enclose each of the at least two rotatable shafts from at least one of the annular flow paths of the gas turbine engine.

3. The apparatus of claim 1, wherein one of either the first plurality of power devices or the second plurality of power devices are one of a generator or a motor.

4. The apparatus of claim 1, which further includes a sump area of the gas turbine engine, wherein the at least two rotatable shafts couple with the at least two spool shafts in the sump area.

5. The apparatus of claim 1, wherein the at least two rotatable shafts terminate within the fan frame.

6. The apparatus of claim 1, wherein the at least two rotatable shafts are power off-take shafts.

7. An apparatus comprising:
a gas turbine engine having a first shaft of a first spool and a second shaft of a second spool and further having a first flow path radially inward of a second flow path;
a first power shaft oriented to extend across the first flow path of the gas turbine engine and operatively coupled to the first shaft;
a first plurality of power device rotatingly coupled with the first power shaft;
a second power shaft oriented to extend across the first flow path of the gas turbine engine and operatively coupled to the second shaft;
a second plurality of power devices coupled to the second power shaft; and
a fan frame including a plurality of fan frame struts, wherein the first the first and second power shafts are located within the plurality of fan frame struts, and wherein the first plurality of power devices and the second plurality of power devices are located in the fan frame.

8. The apparatus of claim 7, wherein the first shaft is a first pressure spool shaft and the second shaft is a second pressure spool shaft where the first pressure spool shaft is associated with a lower pressure spool than the spool that includes the second pressure spool shaft, and wherein the first power device is located between the first flow path and the second flow path.

9. The apparatus of claim 7, wherein the struts are circumferentially displaced relative to each other, and wherein the second plurality of power devices is coupled to the second power shaft via a multi-pad accessory mount.

10. The apparatus of claim 7, which further includes a bevel gearing arrangement to couple the first and second power shafts to the first and second shafts, respectively.

11. The apparatus of claim 7, wherein the first flow path and second flow path are at least partially defined by the fan frame of the gas turbine engine.

12. A method comprising:
operating a gas turbine engine to compress a working fluid with a compressor and extract a power from a turbine;
flowing the working fluid through a first flow path and a second flow path;
transferring a power via a first power shaft between a first engine spool shaft in rotative communication with the compressor and a first power device of a first plurality of power devices disposed within a fan frame and between the first and second flow paths;
rotating a power shaft, the first power shaft extending across the first flow path and in power communication with the first plurality of power devices;
transferring a power via a second power shaft between a second engine spool shaft in rotative communication with the compressor and another power device of a second plurality of power devices disposed within the fan frame and between the first and second flow paths; and
rotating the second power shaft, the second power shaft extending across the first flow path and in power communication with the second plurality of power devices.

13. The method of claim 12, which further includes delivering power from the first engine spool shaft to the power device.

14. The method of claim 12, wherein the first plurality of power devices is located radially outward of the first flow path.

15. The method of claim 14, wherein the second plurality of power devices is located radially inward of the second flow path.

* * * * *